US009872425B2

(12) United States Patent
Anderson et al.

(10) Patent No.: US 9,872,425 B2
(45) Date of Patent: Jan. 23, 2018

(54) SYSTEM FOR POSITIONING GAUGE WHEELS OF AN AGRICULTURAL ROW UNIT (71) Applicant: CNH Industrial America LLC, New Holland, PA (US)

(72) Inventors: Brian John Anderson, Yorkville, IL (US); Johnathon R. Dienst, Dekalb, IL (US)

(73) Assignee: CNH Industrial America LLC, New Holland, PA (US)

( * ) Notice: Subject to any disclaimer, the term of this patent is extended or adjusted under 35 U.S.C. 154(b) by 206 days.

(21) Appl. No.: 14/796,891

(22) Filed: Jul. 10, 2015

(65) Prior Publication Data
US 2017/0010095 A1    Jan. 12, 2017

(51) Int. Cl.
*A01C 7/20*    (2006.01)
*A01C 5/06*    (2006.01)

(52) U.S. Cl.
CPC ............. *A01C 7/203* (2013.01); *A01C 5/06* (2013.01)

(58) Field of Classification Search
CPC ......... A01C 5/064; A01C 7/203; A01B 49/06; A01B 49/065; A01B 49/027
USPC ............................. 33/613, 624, 625; 111/69
See application file for complete search history.

(56) References Cited

U.S. PATENT DOCUMENTS

| | | |
|---|---|---|
| 3,625,293 A | 12/1971 | Nelson |
| 3,642,073 A | 2/1972 | Geurts |
| 4,009,668 A | 3/1977 | Brass et al. |
| 4,273,057 A | 6/1981 | Pollard |
| 4,398,478 A | 8/1983 | Frase et al. |
| 4,404,918 A | 9/1983 | Whalen et al. |
| 4,413,685 A | 11/1983 | Gremelspacher et al. |
| 4,423,788 A | 1/1984 | Robinson, Jr. et al. |
| 4,450,779 A | 5/1984 | Bailey |
| 4,702,323 A | 10/1987 | Smit et al. |
| 5,595,130 A | 1/1997 | Baugher et al. |
| 5,934,208 A * | 8/1999 | Clemons ............... A01C 7/203 111/135 |
| 6,148,747 A | 11/2000 | Deckler et al. |
| 6,827,029 B1 * | 12/2004 | Wendte ................. A01C 7/042 111/185 |
| 6,918,343 B2 | 7/2005 | Kester |
| 6,935,253 B2 * | 8/2005 | Murray ................. A01C 7/203 111/135 |

(Continued)

FOREIGN PATENT DOCUMENTS

| | | |
|---|---|---|
| WO | 2008008345 A3 | 1/2008 |
| WO | 2014066654 A1 | 5/2014 |

*Primary Examiner* — Christopher Fulton
(74) *Attorney, Agent, or Firm* — Rebecca L. Henkel; Rickard K. DeMille (57) ABSTRACT A system for positioning a gauge wheel of an agricultural row unit includes the gauge wheel coupled to a frame of the agricultural row unit via a position assembly. The position assembly is configured to enable the gauge wheel to rotate between an engagement position and a home position. The system also includes a blocking member of the position assembly. Also, the system includes a protrusion integrally formed on the frame of the agricultural row unit. The protrusion is configured to engage the blocking member to block rotation of the position assembly away from the engagement position while in the home position.

17 Claims, 6 Drawing Sheets

(56) References Cited

U.S. PATENT DOCUMENTS

| | | | |
|---|---|---|---|
| 6,983,705 B1 * | 1/2006 | Gust | A01B 63/166 |
| | | | 111/167 |
| 7,191,715 B2 | 3/2007 | Wendte et al. | |
| 7,360,494 B2 | 4/2008 | Martin | |
| 7,360,495 B1 | 4/2008 | Martin | |
| 7,481,278 B1 * | 1/2009 | Pomedli | A01C 5/064 |
| | | | 111/167 |
| 7,631,607 B2 * | 12/2009 | Vandersnick | A01C 7/205 |
| | | | 111/193 |
| 7,946,232 B2 | 5/2011 | Patwardhan et al. | |
| 8,186,287 B2 * | 5/2012 | Schilling | A01C 5/064 |
| | | | 111/167 |
| 8,235,134 B2 | 8/2012 | Schilling | |
| 8,291,997 B2 | 10/2012 | Kovach et al. | |
| 8,635,962 B2 * | 1/2014 | Schilling | A01C 7/203 |
| | | | 111/134 |
| 9,357,692 B2 * | 6/2016 | Johnson | A01B 63/008 |
| 9,497,900 B2 * | 11/2016 | Nelson | A01C 5/066 |
| 9,554,504 B2 * | 1/2017 | Houck | A01C 7/203 |
| 2012/0261149 A1 | 10/2012 | Schmidt | |
| 2014/0090585 A1 | 4/2014 | Sauder et al. | |
| 2014/0190374 A1 | 7/2014 | Anderson et al. | |
| 2014/0190711 A1 | 7/2014 | Horsch | |
| 2015/0351313 A1 * | 12/2015 | Dienst | A01B 49/06 |
| | | | 111/149 |

* cited by examiner

SYSTEM FOR POSITIONING GAUGE WHEELS OF AN AGRICULTURAL ROW UNIT

BACKGROUND

The invention relates generally to agricultural implements, and more specifically, to a system for positioning gauge wheels of an agricultural row unit.

Generally, planting implements (e.g., planters) are towed behind a tractor or other work vehicle via a mounting bracket secured to a rigid frame of the implement. These planting implements typically include multiple row units distributed across the width of the implement. Each row unit is configured to deposit seeds at a desired depth beneath the soil surface, thereby establishing rows of planted seeds. For example, each row unit may include an opener assembly having a ground engaging tool or opener (e.g., an opener disc) that forms a seeding path for seed deposition into the soil. In certain configurations, the opener assembly also includes one or more gauge wheels positioned a vertical distance above the opener to establish a desired furrow depth for seed deposition into the soil. As the implement travels across a field, the opener excavates a furrow (e.g., trench) into the soil, and seeds are deposited into the furrow (e.g., via a seed tube positioned reward of the opener assembly). In certain row units, the opener assembly is followed by a closing device such as a set of closing discs or wheels that direct the soil back into the furrow and/or a packer wheel that packs the soil on top of the deposited seeds.

In certain planting implements, the opener assembly of each row unit includes multiple opener discs that penetrate the soil to form the furrow. Moreover, the opener discs rotate as the row unit travels across the field, thereby excavating the furrow. As a speed of the row unit increases, a speed of rotation of the opener discs also increases. Consequently, the opener discs may displace soil an undesirable distance away from the furrow. As a result, the effectiveness of the closing discs and/or packer wheel, which are configured to direct the soil back into the furrow to cover the seeds deposited in the furrow, may be reduced. Therefore, uneven seed covering may occur, which may be detrimental to the growing conditions for the seeds, thereby reducing overall crop yields.

BRIEF DESCRIPTION

In an embodiment, a system for positioning a gauge wheel of an agricultural row unit includes the gauge wheel coupled to a frame of the agricultural row unit via a position assembly. The position assembly is configured to enable the gauge wheel to rotate between an engagement position and a home position. The system also includes a blocking member of the position assembly. Also, the system includes a protrusion integrally formed on the frame of the agricultural row unit. The protrusion is configured to engage the blocking member to block rotation of the position assembly away from the engagement position while in the home position.

In another embodiment, a system for positioning a gauge wheel of an agricultural row unit includes the gauge wheel. The system also includes a gauge wheel position assembly mounted on a frame of the agricultural row unit. The position assembly includes a gauge wheel arm extending between an extension positioned on the frame and the gauge wheel. The position assembly also includes a pivot positioned on the frame and rotatably coupled to the gauge wheel arm. The pivot is configured to enable rotation of the position assembly about a pivot axis. The position assembly also includes a blocking feature extending radially outward from the pivot. The system further includes a protrusion on the frame configured to control rotation of the position assembly about the pivot axis via engagement with the blocking feature while the gauge wheel assembly is in a forward position relative to a direction of travel, a rearward position relative to the direction of travel, or a position therebetween on the extension.

In a further embodiment, a system for positioning gauge wheels on an agricultural row unit includes a first gauge wheel positioned on to a first lateral side of a frame assembly of the agricultural row unit. The system also includes a first opener disc positioned proximate to the first gauge wheel on the first lateral side of the frame assembly. The system further includes a first position assembly configured to couple the first gauge wheel to the first lateral side of the frame assembly. The first position assembly includes a first pivot configured to enable rotation of the position assembly about a first pivot axis. The system also includes a first protrusion on the first side of the frame assembly configured to engage the first position assembly and to block rotation of the first position assembly about the first pivot axis away from an engagement position while in a home position. Additionally, the system includes a second gauge wheel positioned on a second lateral side of the agricultural implement, the second side opposite the first side. The second gauge wheel is positioned forward of the first gauge wheel with respect to a direction of travel of the agricultural row unit. The system also includes a second opener disc positioned proximate to the second gauge wheel on the second lateral side of the frame assembly. The second opener disc is positioned forward of the first opener disc, with respect to the direction of travel of the agricultural implement. The system includes a second position assembly configured to couple the second gauge wheel to the second lateral side of the frame assembly. The second position assembly includes a second pivot configured to enable rotation of the second position assembly about a second pivot axis. The system also includes a second protrusion on the second side of the frame assembly configured to engage the second position assembly and to block rotation of the second gauge wheel about the second pivot axis away from the engagement position while in the home position.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments disclosed herein relate to a system for positioning staggered gauge wheels of an agricultural row unit in a home position. In certain embodiments, the system includes first and second gauge wheels coupled to opposite sides of a frame assembly via first and second position assemblies. The first and second position assemblies are configured to rotate the first and second gauge wheels about respective first and second pivot axes to transition the gauge wheels between an engagement position and the home position. In certain embodiments, the first and second position assemblies include first and second blocking features configured to contact respective first and second ridges formed on the frame assembly. Contact between the blocking features and the respective ridges blocks rotation of the first and second gauge wheels in a downward direction while the first and second gauge wheels are in the home position. In certain embodiments, the first and second ridges are formed on a first production extending from the frame assembly. The first and second ridges may be long enough to accommodate staggered wheels (e.g., block rotation of the first and second gauge wheels in different positions). Moreover, the pivot assemblies may be mounted on a second protrusion that is sized to accommodate staggered wheels.

Figure 1:
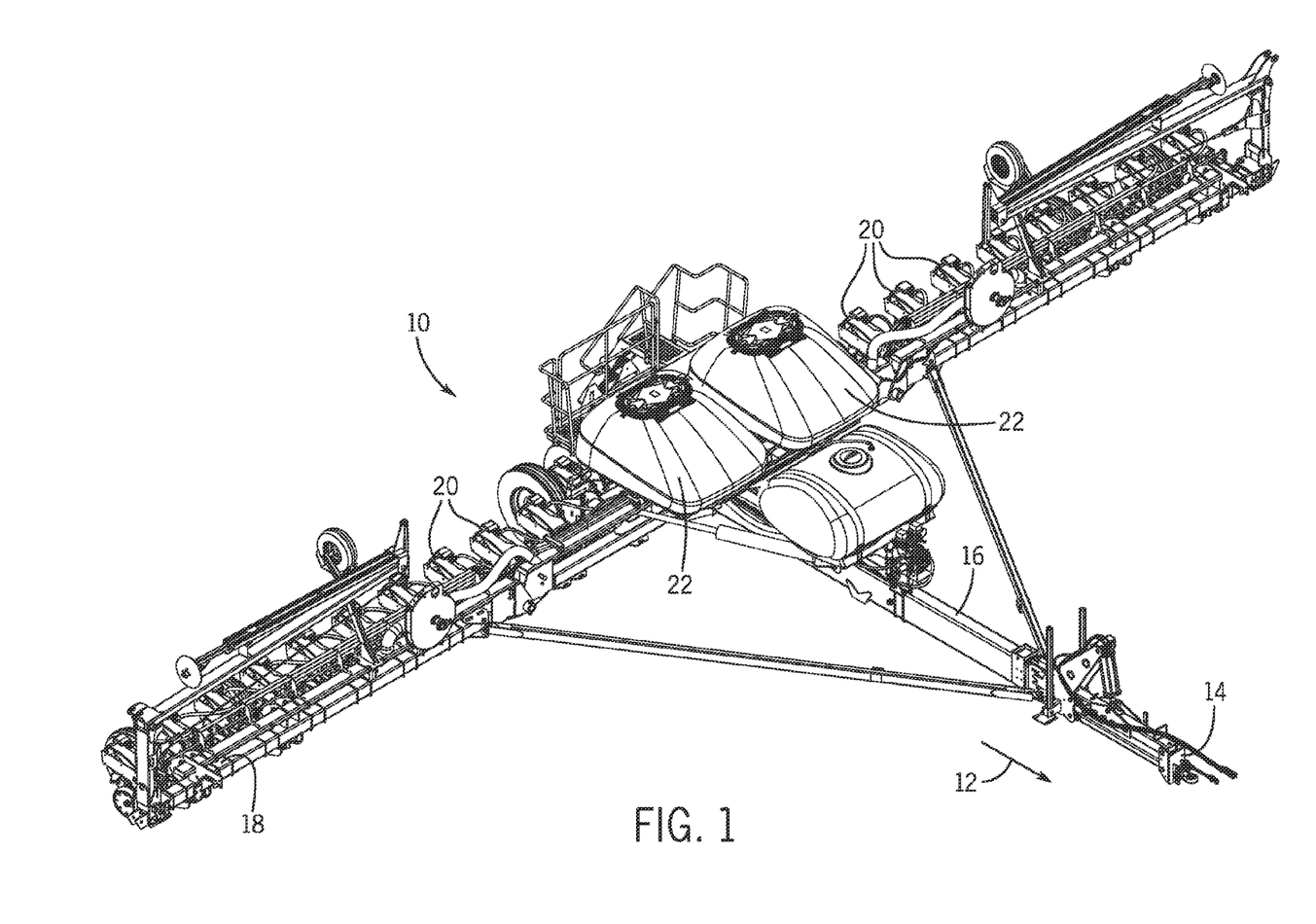
FIG. 1 is a perspective view of an embodiment of an agricultural implement configured to deposit seeds into a soil surface.

FIG. 1 is a perspective view of an embodiment of an agricultural implement 10 configured to deposit seeds into a soil surface. In the illustrated embodiment, the implement 10 is configured to be towed along a direction of travel 12 by a work vehicle, such as a tractor or other prime mover. The work vehicle may be coupled to the implement 10 by a hitch assembly 14. As illustrated, the hitch assembly 14 is coupled to a main frame assembly 16 of the implement 10 to facilitate towing of the implement 10 in the direction of travel 12. In the illustrated embodiment, the frame assembly 16 is coupled to a tool bar 18 that supports multiple row units 20. Each row unit 20 is configured to deposit seeds at a desired depth beneath the soil surface, thereby establishing rows of planted seeds. The implement 10 also includes seed tanks 22 and a pneumatic distribution system configured to convey seeds from the tanks to the row units 20. In certain embodiments, the pneumatic distribution system includes an inductor box positioned beneath each seed tank 22. Each inductor box is configured to receive seeds from a respective tank, to fluidize the seeds into an air/seed mixture, and to distribute the air/seed mixture to the row units 20 via a network of pneumatic hoses/conduits.

In certain embodiments, each row unit 20 includes a row unit attachment, an opening assembly, a seed tube, a closing assembly, and a press wheel. The row unit attachment may include a rotating wheel having multiple tillage points or fingers that break up or displace crop residue, thereby preparing the soil for seed deposition. Moreover, the row unit attachment may include a pair of discs used to clear a path through material such as dirt clods or rocks. The opening assembly includes one or more gauge wheels and one or more opener discs. Each gauge wheel may be positioned a vertical distance above a respective opener disc to establish a desired furrow depth for seed deposition into the soil. The closing assembly may include a pair of closing discs or wheels. As the row unit travels across a field, the opener discs excavate a furrow into the soil for seed deposition. The seed tube, which may be positioned behind the opening assembly, directs a seed from a metering system into the excavated furrow. The closing discs or wheels then direct the excavated soil into the furrow to cover the planted seed. Finally, the press wheel packs the soil on top of the seed with a desired pressure.

While the illustrated implement 10 includes 24 row units 20, it should be appreciated that alternative implements may include more or fewer row units 20. For example, certain implements 10 may include 4, 6, 8, 12, 16, 24, 32, 36, or 54 row units, or more. In addition, the spacing between row units 20 may be particularly selected based on the type of crop being planted. For example, the row units 20 may be spaced 30 inches from one another for planting corn, and 15 inches from one another for planting soy beans.

In certain embodiments, the opener discs of each row unit 20 are staggered relative to one another. For example, one opener disc may be offset from the other disc by a half inch, three-quarters of an inch, one inch, or any suitable distance relative to the direction of travel. As a result, the gauge wheels associated with the opener discs may also be offset (e.g., one gauge wheel may be positioned farther forward relative to the direction of travel than the other gauge wheel) to control the soil penetration depth by the respective opener discs. The gauge wheels are configured to control the soil penetration depth of the opener discs and to control the soil displaced by the opener discs near the furrows. As will be described in detail below, a gauge wheel arm may be configured to rotate each staggered gauge wheel between an engagement position and a home position.

Figure 2:
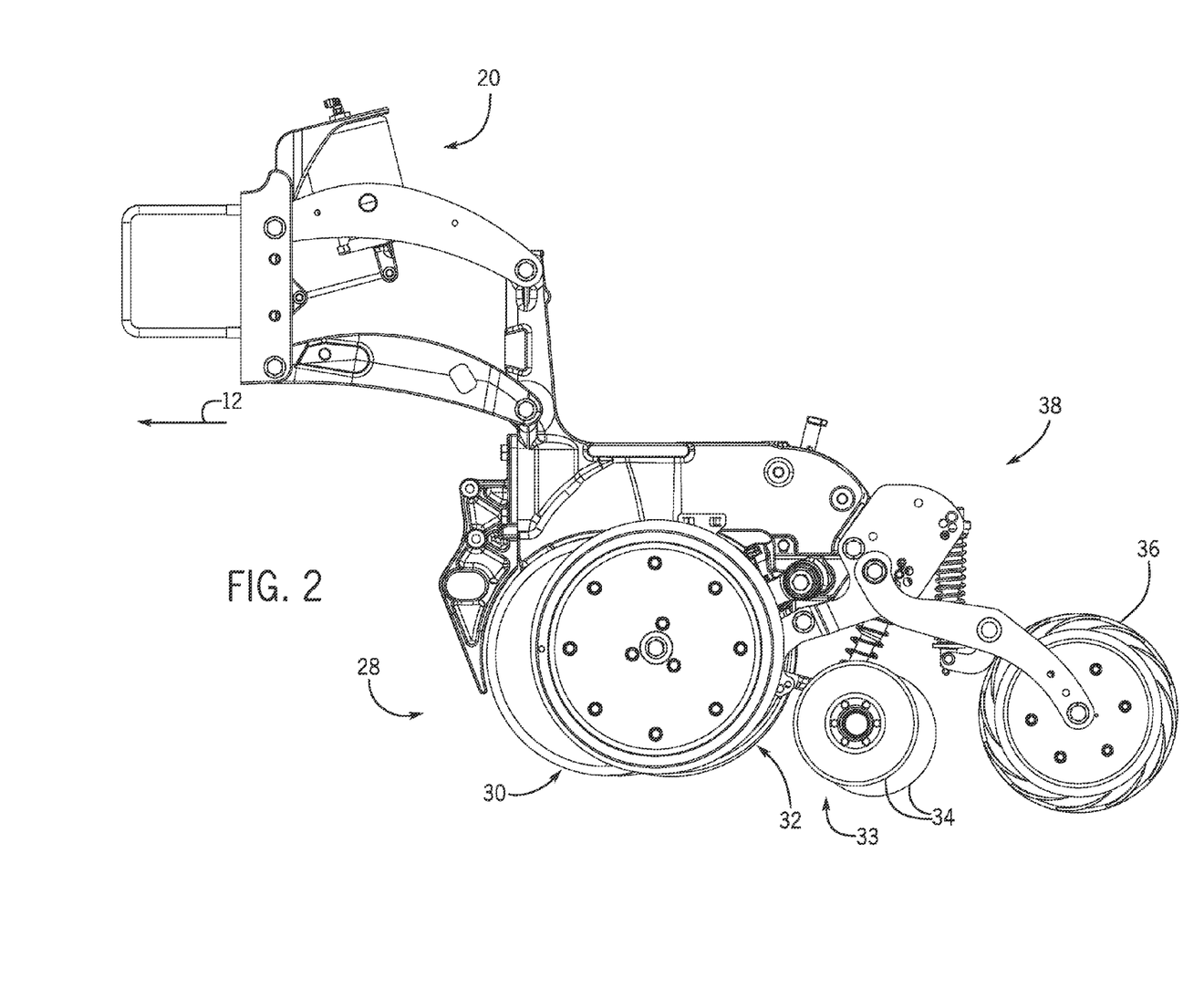
FIG. 2 is a left side view of an embodiment of a row unit, which may be used in the agricultural implement of FIG. 1, having an opener assembly with gauge wheels disposed adjacent to opener discs.

FIG. 2 is a left side view of an embodiment of a row unit 20 having an opener assembly 28 with two gauge wheels 32 disposed adjacent to two opener discs 30. The row unit 20 includes multiple components that facilitate planting operations. As illustrated, the row unit 20 includes the opener assembly 28 having opener discs 30 (e.g., openers) that rotate through soil as the row unit 20 travels across a field to form a furrow for planting seeds. Additionally, the gauge wheels 32 may be configured to set a penetration depth of the opener discs 30 into the soil. The depth set by the gauge wheels 32 may be selected by an operator, such that the furrow depth resulting from rotation of the opener discs 30 is adjustable. For example, certain seeds may be planted deep into soil to facilitate enhanced plant growth. Conversely, other seeds may be planted at a shallow depth to facilitate enhanced plant growth.

Once the seeds are deposited in the furrow, a closing assembly 33 may direct the soil displaced by the opener assembly back into the furrow to cover the seeds. As illustrated, the closing assembly 33 includes closing discs 34 disposed rearwardly from the gauge wheels 32 relative to the direction of travel 12. The closing discs 34 are positioned to direct soil back into the furrow to cover the seeds. Furthermore, a packing wheel 36 may follow the closing discs 34 to compact the soil onto the seeds.

In certain embodiments, a portion of each opener disc 30 may be in physical contact with the respective gauge wheel 32. Accordingly, the gauge wheels 32 may scrape soil off of the opener discs 30 to reduce soil build-up on the discs and/or to enable the furrow to be consistently formed. The opener discs 30, the gauge wheels 32, the closing discs 34, and the packing wheel 36 are coupled to a frame assembly 38 of the row unit 20, which is configured to support each element of the row unit 20.

Figure 3:
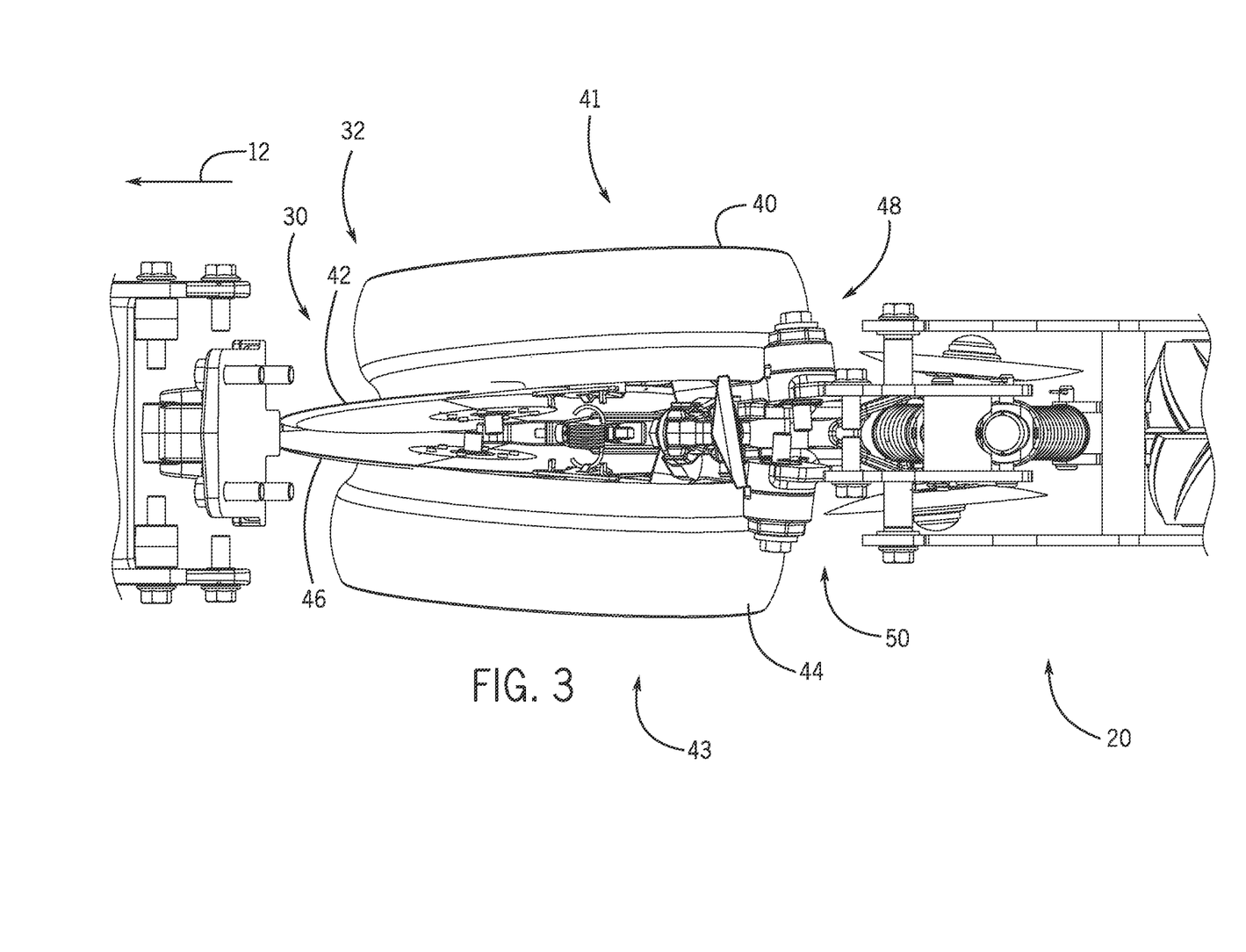
FIG. 3 is a top view of the row unit of FIG. 2, in which a frame is partially removed for clarity.

FIG. 3 is a top view of the row unit 20, in which the frame assembly 38 is partially removed for clarity. As shown, the row unit 20 includes a first gauge wheel 40 mounted proximate to a first opener disc 42 and a second gauge wheel 44 mounted proximate to a second opener disc 46. In the following discussion, the first gauge wheel 40 will be referred to as being on a right side 41, and the second gauge wheel 44 will be referred to as being on a left side 43. In the illustrated embodiment, the second opener disc 46 and the second gauge wheel 44 are mounted farther forward (e.g., relative to the direction of travel 12) than the first opener disc 42 and first gauge wheel 40. However, in other embodiments, the first opener disc 42 and the first gauge wheel 40 may be farther forward than the second opener disc 46 and the second gauge wheel 44. As will be described in detail below, the first and second gauge wheels 40, 44 are configured to transition between an engagement position and a home position via a first position assembly 48 and a second position assembly 50, respectively.

In the illustrated embodiment, the first and second position assemblies 48, 50 are offset relative to one another along the direction of travel 12. The second position assembly 50 is positioned forward of the first position assembly 48, thereby positioning the second gauge wheel 44 forward of the first gauge wheel 40. However, in other embodiments, the positions of the first and second position assemblies 48, 50 may be reversed. As described herein, the second gauge wheel 44 may be described as being in a forward position and the first gauge wheel 40 may be described as being in a rearward position.

Figure 4:
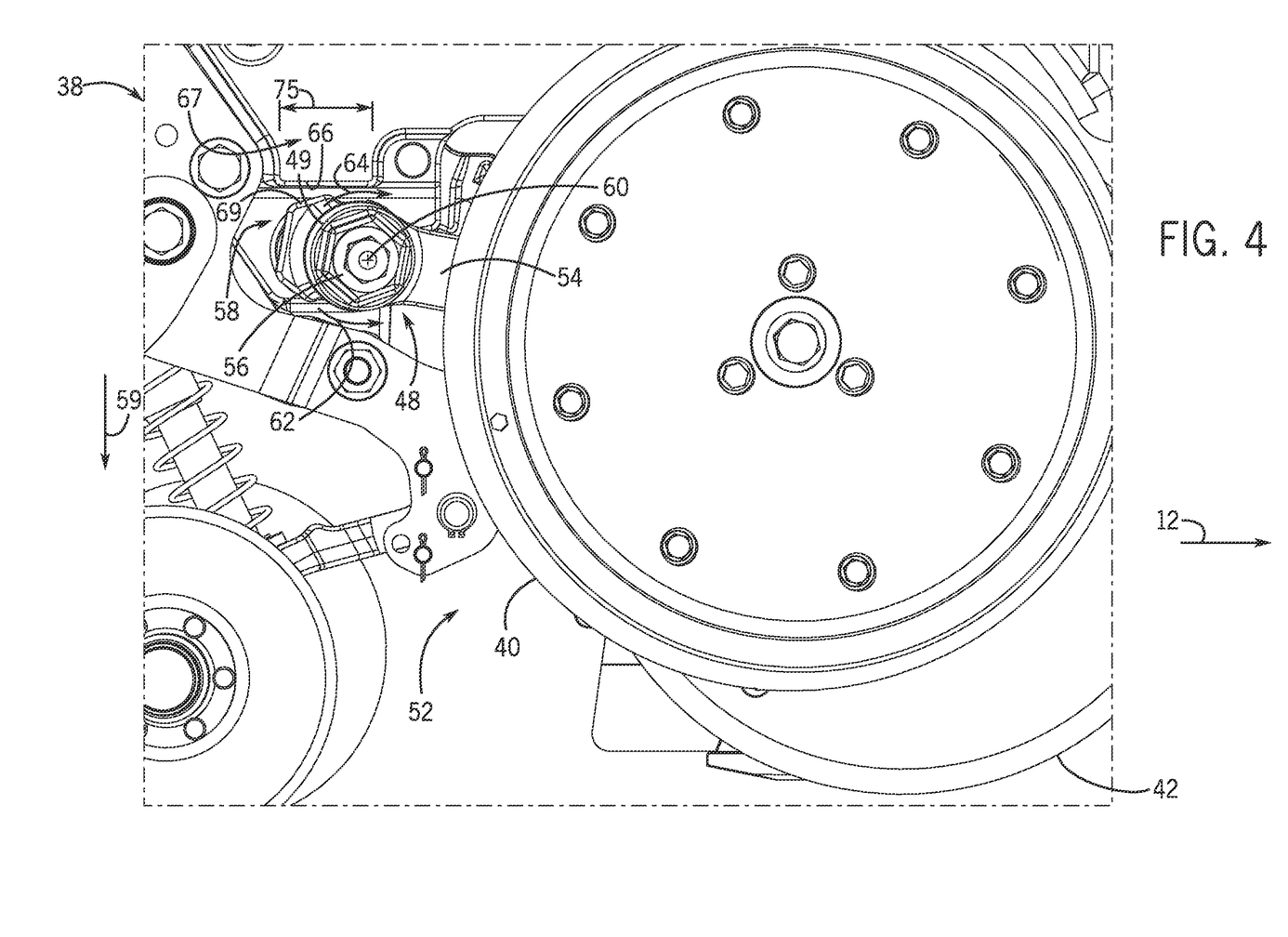
FIG. 4 is a right side view of a portion of the row unit of FIG. 2, in which a first gauge wheel mounted on the frame assembly is in an engagement position.

FIG. 4 is a right side view of the first gauge wheel 40 in an engagement position 52. While in the engagement position 52, the first gauge wheel 40 is in contact with the soil surface, and the first opener disc 42 is engaged with the soil surface and configured to form a furrow by displacing soil as the agricultural implement 10 moves in the direction of travel 12. In certain embodiments, the row unit 20 may be transitioned between a working position and a transport position via the tool bar 18 (e.g., the operator may raise or lower the tool bar 18). As will be described below, moving the row unit 20 to the working position may facilitate movement of the gauge wheels from a home position to the engagement position 52. As shown, the first opener disc 42 is positioned forward of the first gauge wheel 40 relative to the direction of travel 12. As a result, soil displaced by the first opener disc 42 is received by the first gauge wheel 40 and at least partially blocked from moving laterally outward from the furrow. For example, the first gauge wheel 40 may include a recess configured to collect and deposit the soil from the furrow proximate to the furrow.

In the illustrated embodiment, the first gauge wheel 40 is configured to move between the engagement position 52 and the home position via the first position assembly 48. As shown, the first position assembly 48 is mounted on a first extension 49 and includes a first gauge wheel arm 54, a first pivot 56, and a first blocking feature 58. The first extension 49 extends laterally from the frame assembly 38. The first gauge wheel 40 is rotatably coupled to the first gauge wheel arm 54. In the illustrated embodiment, the first gauge wheel arm 54 is rotatably coupled to an inner side (e.g., a side proximate to the first opener disc 42) of the first gauge wheel 40. For example, the first gauge wheel arm 54 may be bolted, welded, or otherwise attached to the first gauge wheel 40. However, in other embodiments, the first gauge wheel arm 54 may couple to an outer side of the first gauge wheel 40. In certain embodiments, the first gauge wheel arm 54 is made of metal (e.g., steel).

To facilitate transition between the engagement position 52 and the home position, the first gauge wheel arm 54 is coupled to the first pivot 56. In certain embodiments, the first gauge wheel arm 54 and the first pivot 56 are integrally formed. As shown, the first pivot 56 is configured to enable the first gauge wheel 40 to move between the engagement position 52 and the home position via rotation about a first pivot axis 60. For example, when the tool bar 18 is lowered, the row unit 20 moves in a downward direction 59, and the first gauge wheel 40 contacts the surface of the soil. Furthermore, the first position assembly 48 rotates about the first pivot axis 60 in a first direction 62 as the tool bar 18 continues to move in the downward direction 59. The degree of rotation is variable based on the desired depth of the furrow. For example, a greater degree of rotation causes the opener assembly to produce a deeper furrow and vice versa. Moreover, the first pivot 56 enables the first gauge wheel 40 to conform to uneven terrain of the agricultural field via rotation about the first pivot axis 60 via the first position assembly 48. For instance, the first position assembly 48 may rotate in the first direction 62 in response to encountering a hill or bump on the agricultural field.

In the illustrated embodiment, the first blocking feature 58 is configured to block rotation of the first position assembly 48 past a specified point (e.g., the home position) about the first pivot axis 60 in a second direction 64. For example, in certain embodiments, the first blocking feature 58 is configured to contact a first ridge 66 positioned on a first protrusion 67, which is formed in the frame assembly 38, to block rotation of the first position assembly 48 about the first pivot axis 60 in the second direction 64 beyond the home position 68. For example, a first blocking surface 69 may engage the first ridge 66 to block rotation of the first position assembly 48. In the illustrated embodiment, the first blocking feature 58 is integrally formed on the first pivot 56. However, in other embodiments, the first blocking feature 58 may be welded or otherwise coupled to the first pivot 56. Moreover, the shape of the first blocking feature 58 may be particularly selected to accommodate the shape of the first ridge 66. For instance, the first blocking feature 58 may be rectangular, arcuate, or the like. Furthermore, while the illustrated first protrusion 67 is a generally rectangular feature of the frame assembly 38, in certain embodiments the shape of the first ridge 66 may be modified to control rotation of the first gauge wheel arm 54. For example, the first protrusion 67 may be arcuate, circular, elliptical, or the like. In certain embodiments, the shape of the first ridge 66 corresponds to the shape of the first blocking surface 69 of the first blocking feature 58. Moreover, the first ridge 66 of the first protrusion 67 has a first length 75 long enough to accommodate the gauge wheels 32 in the forward position or the rearward position. That is, the first ridge 66 can accommodate gauge wheels 32 in either position relative to adjacent gauge wheels 32. As will be described in detail below, the first blocking feature 58 and the first protrusion 67 block rotation of the gauge wheels 32 via contact between the first ridge 66 and the first blocking surface 69, regardless of the staggered configuration of the gauge wheels 32.

Figure 5:
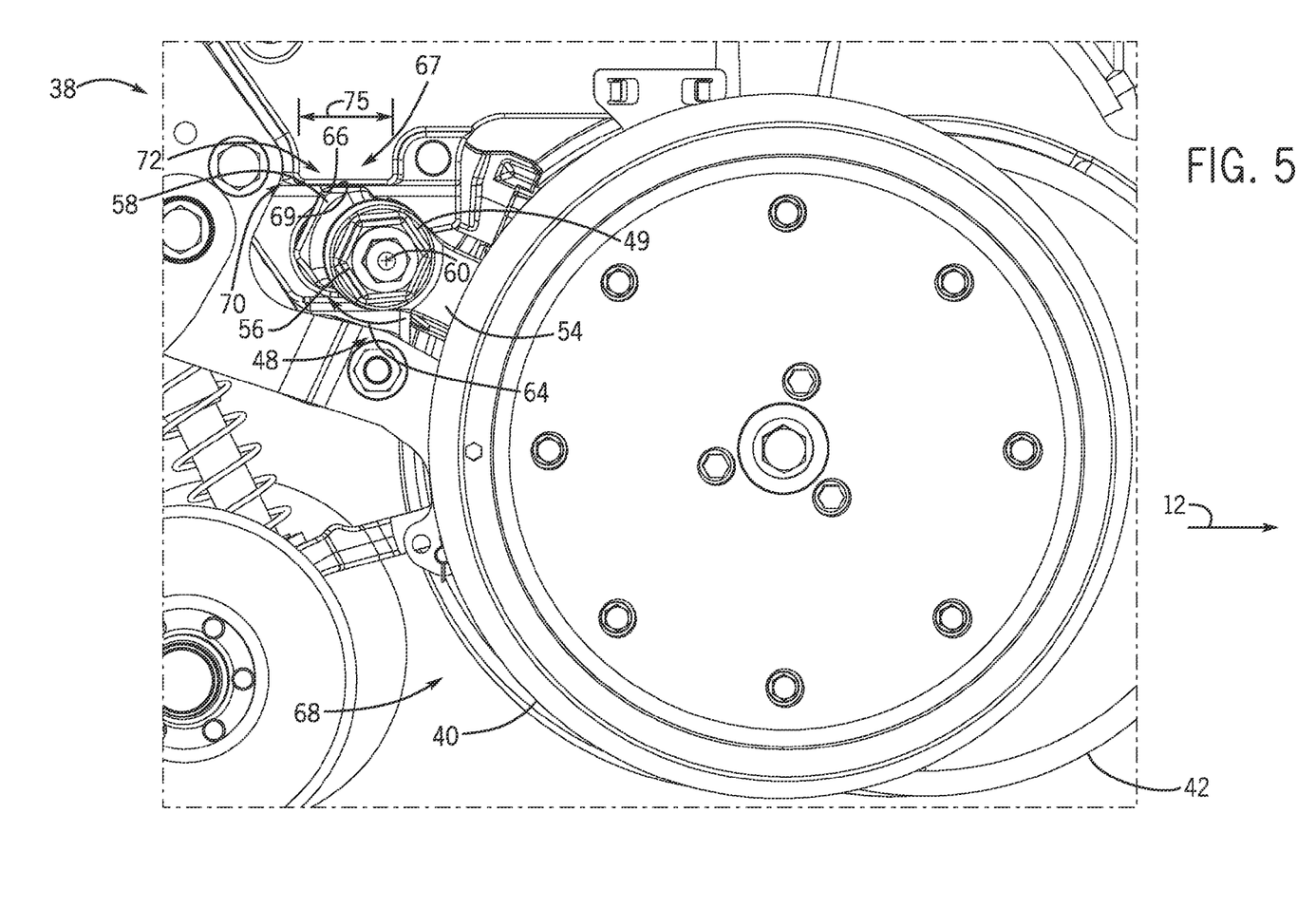
FIG. 5 is a right side view of a portion of the row unit of FIG. 2, in which a first gauge wheel mounted on the frame assembly is in a home position.

FIG. 5 is a right side view of the first gauge wheel 40 in a home position 68. As shown, the first blocking surface 69 of the first blocking feature 58 contacts the first ridge 66 of the first protrusion 67. Because of the rearward positioning of the first position assembly 48, the first blocking surface 69 contacts the first ridge 66 at a rear edge 70 of the first protrusion 67, proximate to a rear end 72 of the first blocking feature 58. As described above, the operator may raise and/or lower the row unit 20 via the tool bar 18. In embodiments in which the tool bar 18 is lifted to transition the implement into a transport configuration, the weight of the first gauge wheel 40 may induce rotation of the first position assembly 48 in the second direction 64 about the first pivot axis 60, as compared to the position shown in FIG. 4. As the first blocking feature 58 rotates about the first pivot axis 60, the first blocking surface 69 contacts the first ridge 66 of the first protrusion 67, thereby blocking further rotation of the first position assembly 48 in the second direction 64.

Figure 6:
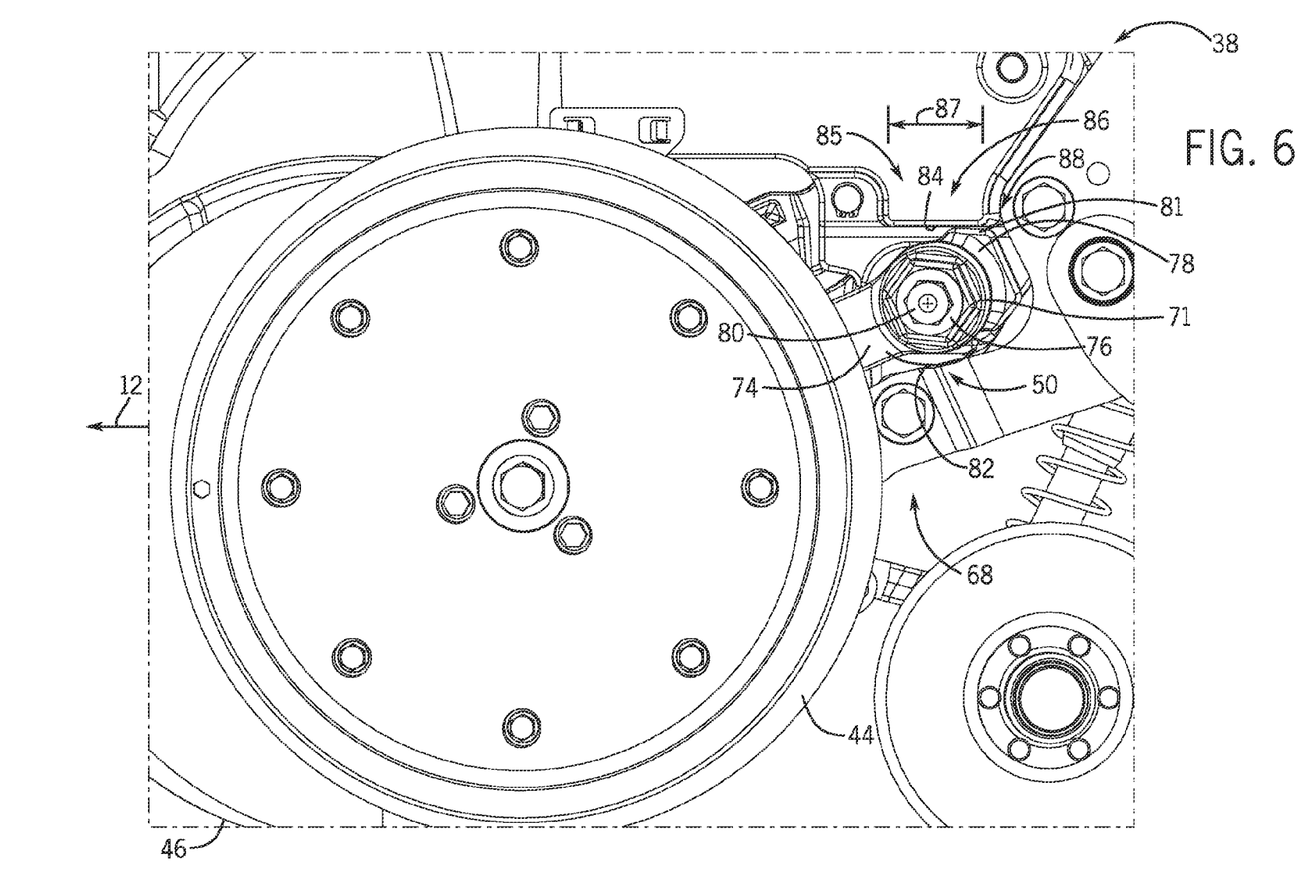
FIG. 6 is a left side view of a portion of the row unit of FIG. 2, in which a second gauge wheel mounted on the frame assembly is in a home position.

FIG. 6 is a left side view of the second gauge wheel 44 in the home position 68. As mentioned above, in certain embodiments, the opener discs 30 are staggered such that the second opener disc 46 is in front (e.g., positioned farther forward) of the first opener disc 42. Accordingly, the gauge wheels 32 are staggered relative to the opener discs 30 (e.g., the second gauge wheel 44 is positioned farther forward than the first gauge wheel 40). In the illustrated embodiment, the second gauge wheel 44 is farther forward than the first gauge wheel 40, resulting in the second position assembly 50 being positioned farther forward on the frame assembly 38. The second position assembly 50 is positioned on a second extension 71 and includes a second gauge wheel arm 74, a second pivot 76, and a second blocking feature 78. As described above with respect to the first position assembly 48, the second position assembly 50 is configured to rotate about a second pivot axis 80 of the second pivot 76 in a third direction 82 to transition the second gauge wheel 44 from the engagement position 52 to the home position 68.

In the illustrated embodiment, while the second gauge wheel 44 is in the home position 58, a second blocking surface 81 of the second blocking feature 78 is contacts a second ridge 84 on a second protrusion 85 having a second length 87. In the illustrated embodiment, the second blocking surface 81 contacts the second ridge 84 at a front end 86 proximate to a forward edge 88 of the second ridge 84. As mentioned above, because the second position assembly 50 is positioned farther forward than the first position assembly 48, the second blocking surface 81 contacts the second ridge 84 farther forward than the first blocking surface 69 contacts the first ridge 66. However, the second ridge 84 of the second protrusion 85 is sized to accommodate different positions of the second position assembly 50. Accordingly, the second blocking surface 81 may contact different regions of the second protrusion 85 depending on the position of the second gauge wheel 44.

As mentioned above, the first and second blocking surfaces 69, 81 are configured to contact first and second ridges 66, 84 to block rotation of the gauge wheels 32 in the first and third directions 62, 82 while the gauge wheels 32 are in the home position 68. In the illustrated embodiment, the first and second ridges 66, 84 are positioned at substantially the same longitudinal location (e.g., same location relative to the direction of travel 12) on respective sides of the frame assembly 38. That is, the longitudinal placement of the first protrusion 67 on the left side of the frame assembly 38 is substantially the same as the longitudinal placement of the second protrusion 85 on the right side of the frame assembly 38. As a result, the gauge wheels 32 may be mounted in a configuration in which either the first gauge wheel 40 or the second gauge wheel 44 is positioned farther forward with respect to the direction of travel 12. In other words, the first and second ridges 66, 84 are arranged on the frame assembly 38 such that the first and second blocking surfaces 69, 81 of the first and second blocking features 58, 78 contact the respective first and second ridges 66, 84 of the first and second protrusions 67, 85 regardless of whether the respective gauge wheel 32 is in the forward position, as shown in FIG. 6, or in the rearward position, as shown in FIG. 5, or in a position therebetween. Accordingly, the first and second ridges 66, 84 are configured to be long enough to accommodate a range of longitudinal positions of the first and second blocking features 58, 78, as established by the length of the first and second protrusions 67, 85.

As described in detail above, a system for positioning staggered gauge wheels 32 in the home position 68 is disclosed. The first and second position assemblies 48, 50 couple the first and second gauge wheels 40, 44 to the frame assembly 38 of the row unit 20. In certain embodiments, the first and second gauge wheels 40, 44 are staggered relative to the direction of travel 12 of the agricultural implement 10. Accordingly, the first and second position assemblies 48, 50 are staggered relative to one another with respect to the respective first and second gauge wheels 40, 44. The first and second position assemblies 48, 50 are configured to rotate about respective first and second pivot axes 60, 80 to transition between the engagement position 52 and the home position 68. While in the home position 68, the first and second blocking surfaces 69, 81 contact respective first and second ridges 66, 84 to block rotation of the first and second position assemblies 48, 50. As a result, rotation of the first and second position assemblies 48, 50 about the respective first and second pivot axes 60, 80 is blocked beyond the particularly selected home position.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for positioning a gauge wheel of an agricultural row unit, comprising:
   a position assembly comprising a gauge wheel arm, a pivot, and a blocking member, wherein the gauge wheel arm, the pivot, and the blocking member are rigidly and non-rotatably coupled to one another;
   the gauge wheel rotatably coupled to the gauge wheel arm, wherein the gauge wheel arm, the pivot, and the blocking member are rotatably coupled to a frame of the agricultural row unit by the pivot, and the position assembly is configured to enable the gauge wheel to move between an engagement position and a home position via rotation of the gauge wheel arm, the pivot, and the blocking member about a pivot axis; and a protrusion integrally formed on the frame of the agricultural row unit, wherein the protrusion is configured to engage the blocking member to block movement of the gauge wheel away from the engagement position while the gauge wheel is in the home position.

2. The system of claim 1, wherein the blocking member is integrally formed with the pivot.

3. The system of claim 1, wherein the frame is configured to couple to a tool bar of an agricultural implement.

4. The system of claim 1, wherein the blocking member has a blocking surface, the protrusion has a ridge, and the blocking surface is configured to engage the ridge to block movement of the gauge wheel away from the engagement position at least while the gauge wheel is in the home position.

5. The system of claim 1, comprising an extension formed of the frame, wherein the position assembly is configured to couple to the extension.

6. A system for positioning a gauge wheel of an agricultural row unit, comprising:
the gauge wheel;
a position assembly rotatably mounted on a frame of the agricultural row unit comprising:
a gauge wheel arm, wherein the gauge wheel is rotatably coupled to the gauge wheel arm;
a pivot rotatably coupled to the frame, wherein the pivot is rigidly and non-rotatably coupled to the gauge wheel arm, and the pivot is configured to enable rotation of the position assembly about a pivot axis; and
a blocking feature rigidly and non-rotatably coupled to the pivot; and
a protrusion on the frame configured to control rotation of the position assembly about the pivot axis via engagement with the blocking feature while the position assembly is in a forward position relative to a direction of travel, a rearward position relative to the direction of travel, or a position therebetween;
wherein the blocking feature is configured to engage the protrusion at a forward contact region of the protrusion while the position assembly is in the forward position, the blocking feature is configured to engage the protrusion at a rearward contact region of the protrusion while the position assembly is in the rearward position, and the forward contact region is positioned forward of the rearward contact region relative to the direction of travel.

7. The system of claim 6, wherein the blocking feature comprises a blocking surface configured to engage a ridge of the protrusion to control rotation of the position assembly about the pivot axis.

8. The system of claim 7, wherein a shape of the blocking surface corresponds to a shape of the ridge.

9. The system of claim 6, comprising an extension formed on the frame, wherein the position assembly is rotatably coupled to the extension by the pivot.

10. The system of claim 6, wherein the position assembly is configured to rotate about the pivot axis in a first direction to transition from a home position, in which the gauge wheel does not contact a surface of an agricultural field, to an engagement position, in which the gauge wheel contacts the surface of the agricultural field.

11. The system of claim 6, wherein the pivot is disposed behind the gauge wheel relative to the direction of travel.

12. The system of claim 6, wherein the blocking feature is integrally formed with the pivot.

13. A system for positioning a plurality of gauge wheels on an agricultural row unit, comprising:
a first gauge wheel of the plurality of gauge wheels positioned on a first lateral side of a frame of the agricultural row unit;
a first position assembly comprising a first gauge wheel arm, a first pivot, and a first blocking member, wherein the first gauge wheel arm, the first pivot, and the first blocking member are rigidly and non-rotatably coupled to one another, the first gauge wheel is rotatably coupled to the first gauge wheel arm, the first gauge wheel arm, the first pivot, and the first blocking member are rotatably coupled to the first lateral side of the frame by the first pivot, and the first pivot is configured to enable rotation of the position assembly about a first pivot axis;
a first protrusion on the first lateral side of the frame configured to engage the first blocking member to block rotation of the first position assembly about the first pivot axis away from a first engagement position while in a first home position;
a second gauge wheel of the plurality of gauge wheels positioned on a second lateral side of the frame of the agricultural row unit, opposite the first lateral side;
a second position assembly comprising a second gauge wheel arm, a second pivot, and a second blocking member, wherein the second gauge wheel arm, the second pivot, and the second blocking member are rigidly and non-rotatably coupled to one another, the second gauge wheel is rotatably coupled to the second gauge wheel arm, the second gauge wheel arm, the second pivot, and the second blocking member are rotatably coupled to the second lateral side of the frame by the second pivot, the second pivot is configured to enable rotation of the second position assembly about a second pivot axis, and the second position assembly positions the second gauge wheel forward of the first gauge wheel relative to a direction of travel of the agricultural row unit; and
a second protrusion on the second lateral side of the frame configured to engage the second blocking member to block rotation of the second position assembly about the second pivot axis away from a second engagement position while in a second home position;
wherein the first blocking member is configured to engage a rearward contact region of the first protrusion while the first position assembly is in the first home position, the second blocking member is configured to engage a forward contact region of the second protrusion while the second position assembly is in the second home position, and the forward contact region is positioned forward of the rearward contact region relative to the direction of travel.

14. The system of claim 13, wherein the second pivot axis is positioned forward of the first pivot axis relative to the direction of travel.

15. The system of claim 13, wherein the first protrusion comprises a first ridge configured to engage a first blocking surface of the first blocking member to block rotation of the first position assembly away from the first engagement position while in the first home position, and the second protrusion comprises a second ridge configured to engage a second blocking surface of the second blocking member to block rotation of the second position assembly away from the second engagement position while in the second home position.

16. The system of claim 13, wherein the first and second protrusions are integrally formed on the frame.

17. The system of claim 13, wherein a first length of the first protrusion is configured to enable the first protrusion to engage the first blocking member while the first position assembly is in a forward position relative to the direction of travel or a rearward position relative to the direction of travel.

\* \* \* \* \*